(12) United States Patent
Tweedy et al.

(10) Patent No.: US 6,473,183 B1
(45) Date of Patent: Oct. 29, 2002

(54) SHEAR DAMPED FIBER OPTIC SENSOR

(75) Inventors: Michael J. Tweedy, Simi Valley, CA (US); Eric L. Goldner, Valencia, CA (US)

(73) Assignee: Northrop Grumman Corporation, Woodland Hills, CA (US)

(*) Notice: Subject to any disclaimer, the term of this patent is extended or adjusted under 35 U.S.C. 154(b) by 27 days.

(21) Appl. No.: 09/848,928

(22) Filed: May 3, 2001

(51) Int. Cl.[7] .................................................. G01B 9/02
(52) U.S. Cl. ....................................................... 356/477
(58) Field of Search ....................... 356/477; 73/514.26, 73/514.27

(56) References Cited

U.S. PATENT DOCUMENTS

| | | | |
|---|---|---|---|
| 1,605,321 A | | 11/1926 | Bates |
| 2,552,134 A | | 5/1951 | Berliner |
| 2,818,647 A | | 1/1958 | Berliner |
| 3,882,736 A | * | 5/1975 | Jayne ...................... 73/514.15 |
| 4,505,678 A | | 3/1985 | Andersson |
| 4,759,713 A | | 7/1988 | Heiss |
| 4,821,218 A | * | 4/1989 | Potsch ........................ 235/105 |
| 5,030,091 A | | 7/1991 | Svanberg |
| 5,169,314 A | | 12/1992 | Long |
| 5,287,332 A | * | 2/1994 | Lea ............................. 356/477 |
| 5,682,665 A | | 11/1997 | Svanberg |
| 5,882,195 A | | 3/1999 | Low et al. |
| 6,202,488 B1 | * | 3/2001 | Cash ....................... 33/366.23 |
| 6,263,733 B1 | * | 7/2001 | Reimer et al. ........... 73/514.26 |
| 6,317,213 B1 | * | 11/2001 | Hall et al. ................. 356/35.5 |

* cited by examiner

*Primary Examiner*—David P. Porta
(74) *Attorney, Agent, or Firm*—Lynn & Lynn

(57) ABSTRACT

A fiber optic sensor comprises a flexural disk having a pair of fiber optic coils mounted on opposite sides thereof and connected together to form an interferometer that produces an output signal in response to acceleration of the flexural disk. The flexural disk is mounted in a housing having first and second end plates with a sidewall extending between them. The sidewall is formed to have an inwardly facing groove in which an outer edge portion of the flexural disk is mounted. A support member extends between oppositely facing portions of the first and second end plates and through a central passage in the flexural disk. A damping member is mounted on the central support member and arranged to exert a radial force on an inner edge of the central passage in flexural disk to dampen vibrations of the flexural disk and control the sensor output signal amplitude over a selected frequency band in order to maximize dynamic range.

27 Claims, 5 Drawing Sheets

SHEAR DAMPED FIBER OPTIC SENSOR

STATEMENT OF GOVERNMENT RIGHTS

The United States government has rights in this invention under contract N00024-99-C-6332.

BACKGROUND OF THE INVENTION

This invention relates generally to a fiber optic sensor that includes a pair of multiple layer spiral-wound optical fiber coils on opposite sides of a flexural disk with the optical fiber coils being included in an interferometer. Still more particularly, this invention relates to a fiber optic sensor having an elastomeric material arranged to dampen motion resulting from high quality factor (Q) resonances and to limit the maximum travel of the flexural disk in response to acceleration.

SUMMARY OF THE INVENTION

The invention provides a technique for damping vibrations in a flexural disk fiber optic sensor. The invention also provides shock snubbing to prevent damage flexural disk fiber optic sensor upon exposure to high levels of shock and vibration. The invention uses tubing made from a commonly available elastomeric material with known damping properties in a shear damper configuration. The invention provides a significant increase in the system damping with a corresponding Q reduction down to 6 or less, which provides adequate margin to perform within an acceptable operational frequency band.

A fiber optic sensor according to the present invention comprises a flexural disk having a pair of fiber optic coils mounted on opposite sides thereof and connected together to form an interferometer that produces an output signal in response to acceleration of the flexural disk. The fiber optic sensor includes a housing having first and second end plates with a sidewall extending between them. The sidewall is formed to have an inwardly facing groove in which an outer edge portion of the flexural disk is mounted. A support member extends between oppositely facing portions of the first and second end plates and through a central passage in the flexural disk. A damping member is mounted on the central support member and arranged to exert a radial force on an inner edge of the central passage in flexural disk to lock it in place therein to dampen longitudinal vibrations of the flexural member and thereby control the output signal amplitude over a selected frequency range.

The damping member is preferably mounted at a central region of the support member and restrained against lengthwise motion relative to the support member.

The support member preferably includes a groove in which the damping member is mounted. The damping member is formed of an elastomeric material and is axially compressed between end edges of the groove such that the damping member is expanded radially and forced against the inner edge portion of the flexural disk.

DETAILED DESCRIPTION OF THE INVENTION

Figure 1A:
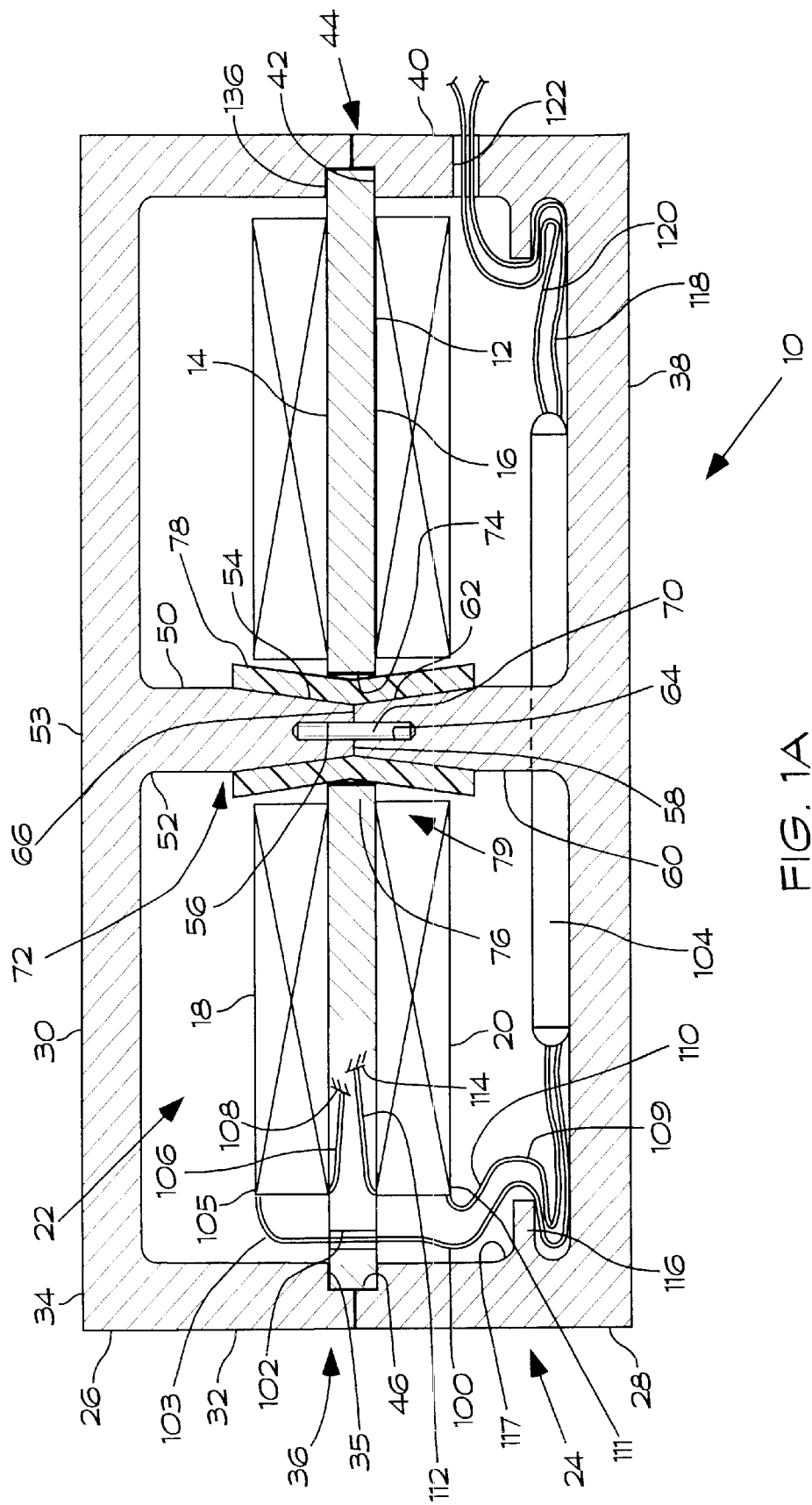
FIG. 1A is a cross sectional view of a shear damped fiber optic sensor according to the present invention.

As shown in FIG. 1A, an interferometric sensor 10 according to the present invention includes a flexural disk 12 having first and second sides 14 and 16, respectively. A first fiber optic coil 18 is connected to the first side 14 of the flexural disk 12. A second fiber optic coil 20 is connected to the second side 16 of the flexural disk 12. For simplicity of illustration, the first and second fiber optic coils 18 and 20, respectively, are indicated as rectangles having crossed diagonal lines. However, it should be understood that the first and second fiber optic coils 18 and 20, respectively, are spiral-wound in accordance with well-known techniques for forming such coils. Examples of spiral wound coils suitable for use in the present invention are disclosed in U.S. Pat. Nos. 5,903,349; 4,959,539; 5,317,929 and 5,883,308, the disclosures of which are incorporated by reference into the present disclosure.

The flexural disk 12 is preferably formed of a structural material such as aluminum. Other materials, such as polycarbonate, may be used to form the flexural disk 12, depending on the operational spectral range of the interferometric sensor 10. The flexural disk 12 and the first and second fiber optic coils 18 and 20 comprise a flexural disk assembly 22 that is the primary transducer for the interferometric sensor 10.

The flexural disk assembly 22 is mounted inside a housing 24 as shown in FIG. 1A. The housing 24 comprises a first housing member 26 and a second housing member 28. Except as noted herein, the first and second housing members 26 and 28, respectively, are preferably essentially identical. The first housing member 26 preferably includes an end plate 30 that preferably is formed as a disk. A sidewall 32 that is preferably formed as a hollow cylinder extends from an outer edge portion 34 of the end plate 30.

The sidewall 32 has a stepped inner diameter such that a notch 35 is formed at an end edge portion 36 of the sidewall 32. The second housing member 28 has an end plate 38 and a sidewall 40. A notch 42 is formed at an end edge portion 44 of the sidewall 40. When the first and second housing members 26 and 28 are placed together end-to-end, the grooves 34 and 42 cooperate to form a groove 46 that faces inward in the housing 24.

Figure 1B:
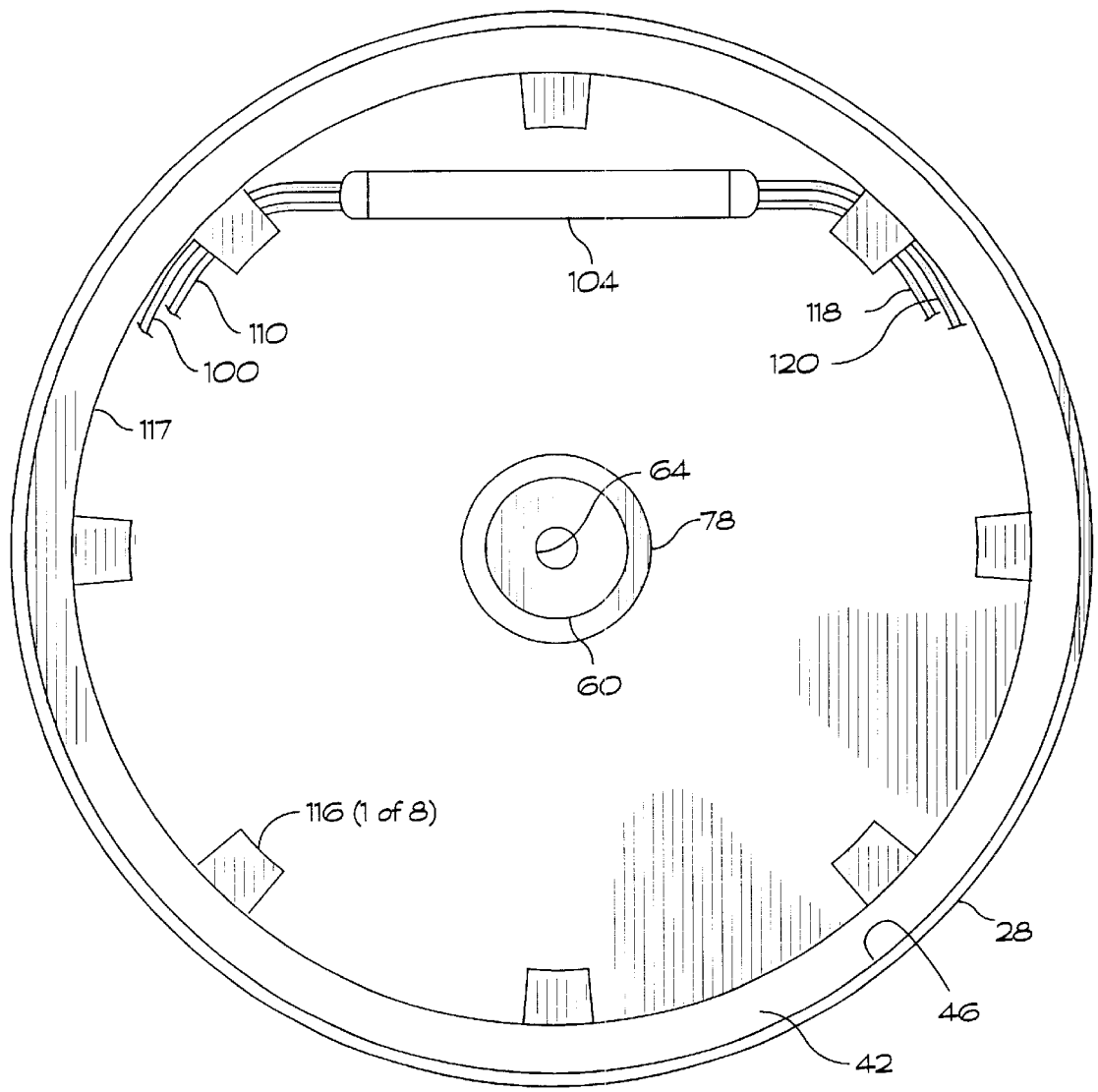
FIG. 1B is a top plan view showing a fiber optic coupler and a damping member mounted in a portion of a housing that may be included in the invention.
Figure 5:
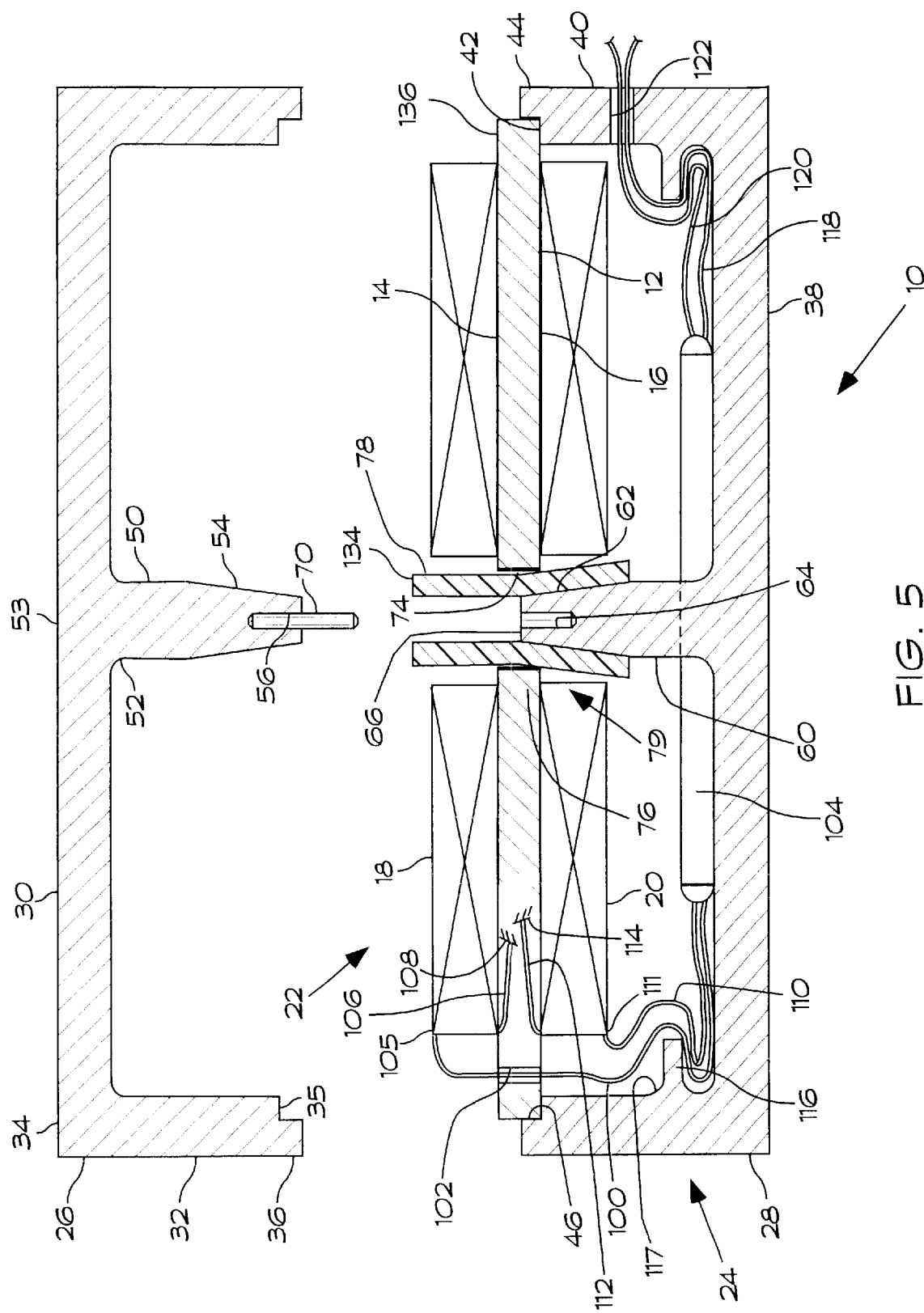
FIG. 5 is an exploded cross sectional view of the invention as shown in FIG. 1A.

The first housing member 26 further includes a post 50. As shown in FIGS. 1 and 5, the post 50 has a base portion 52 that is preferably formed as a cylinder that extends perpendicularly out from a central region 53 of the end plate 30. A cylindrical recess 56 may be formed in an end face 58 of an end portion 54. The end portion 54 is tapered to be in the form of a frustocone such that it has a diameter that increases from the end face 58 toward the base portion 52. The second housing member 28 includes a post 60 that has an end portion 62 that is tapered like the end portion 54 of the post 50. A cylindrical recess 64 is formed in an end face 66 of the post 60.

Although they are described as being separate components of the first housing member 26, the end plate 30, the sidewall 32 and the post 50 preferably are formed together so the first housing member 26 has a unitary structure. The second housing member 28 preferably is formed in the same manner as the first housing member 26. The housing 24 may be formed of any suitable material, such as plastics or metal, which will allow sufficient structural stiffness to ensure that structural resonance frequencies are far from the acoustic frequency range of interest. In the preferred embodiment, aluminum is used. The housing 24 may be manufactured by any suitable means such as machining or casting.

When the interferometric sensor 10 is assembled, a structural adhesive such as epoxy is applied between the end faces 58 and 66 with a dowel pin 70 providing a dual function of aligning the upper and lower posts 50 and 60, respectively, and providing an additional retention force therebetween as well.

Still referring to FIG. 1A, the posts 50 and 60 cooperate to form a support member 72 for the flexural disk 12. The support member 72 extends through a central passage 74 in the flexural disk 12. The central passage 74 has a diameter that is larger than that of the support member 72 so that an inner edge portion 76 of the flexural disk 12 is spaced apart from the central support.

A shear damper 78 is placed between the inner edge portion 76 of the flexural disk 12 and a central region 79 of the support member 72. The tapered shapes of the end portions 54 and 62 make the central region 79 have a circumference that increases in each direction away from the end faces 58 and 66. The shear damper 78 has a thickness such that the inner edge portion 76 of flexural disk 12 fits firmly against the shear damper 78, thereby slightly compressing the damping member 78 radially. The shear damper 78 may be formed of a selected length of tubing formed of a suitable material. The shear damper 78 preferably is comprised of a viscoelastic material such as nitrile, silicone, butyl or polyurethane rubber.

The taper of the posts 50 and 60 aids in assembling the interferometric sensor 10 and further aids in retaining the shear damper 78 in the desired position between the inner edge portion 76 of the flexural disk 12 and the support member 72. Having the diameter of the support member 72 increase along its length away from the flexural disk 12 provides resistance to linear movement of the shear damper 78 on the central support.

Figure 2:
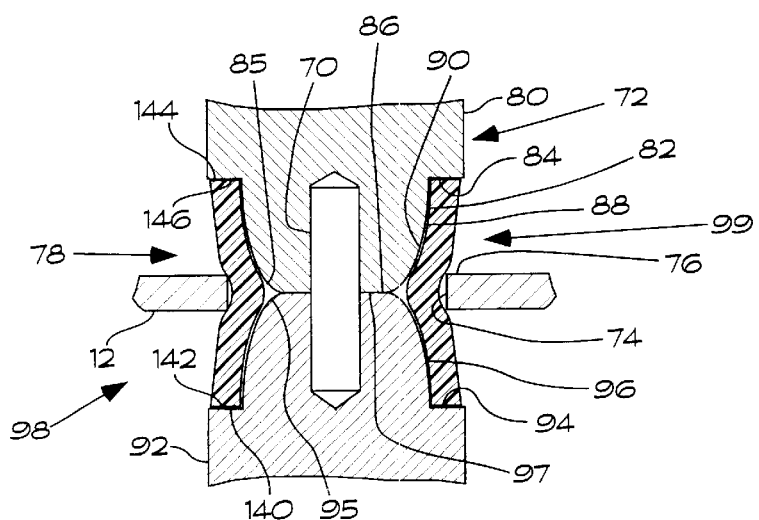
FIG. 2 is a cross sectional view of a portion of an alternate embodiment of the invention.

FIG. 2 shows an alternate structure for retaining the shear damper 78 on the support member 72. A first post 80 that is formed generally as a cylinder has a notched end portion 82 defined by a step 84 in the diameter of the first post 80. The first post 80 has a gradually decreasing diametral taper from the location of the step 84 to an end 86. The tapered portion 88 may have a sidewall 90 that is curved when seen in cross section as in FIG. 2. This curved sidewall 90 transitions into a radius 85 that is designed to ensure that a clearance gap exists between the shear damper 78 and the end face 86 to prevent pinching of the shear damper 78 during final assembly. The first post 80 and a substantially identical second post 92 are placed in end-to-end alignment with the dowel pin 70 being arranged as described above with reference to FIG. 1A. The second post 92 has a step 94 in its diameter, and a tapered portion 96 and radius 95 that are preferably generally identical to the tapered portion 88 and radius 85 of the post 80.

When the first and second posts 80 and 92 are secured together by the dowel pin 70 aided by an interlocking layer of epoxy between the end faces 86 and 97, the steps 84 and 94 in the diameters of the first and second posts 80 and 92 and the tapered end portions 88 and 96 cooperate to form a groove 98 around the support member 72. The groove 98 preferably is formed at a central region 99 of the support member 72 of FIG. 2. The shear damper 78 is placed in the groove 98 and constrained against longitudinal movement by the steps 84 and 94.

Figure 3:
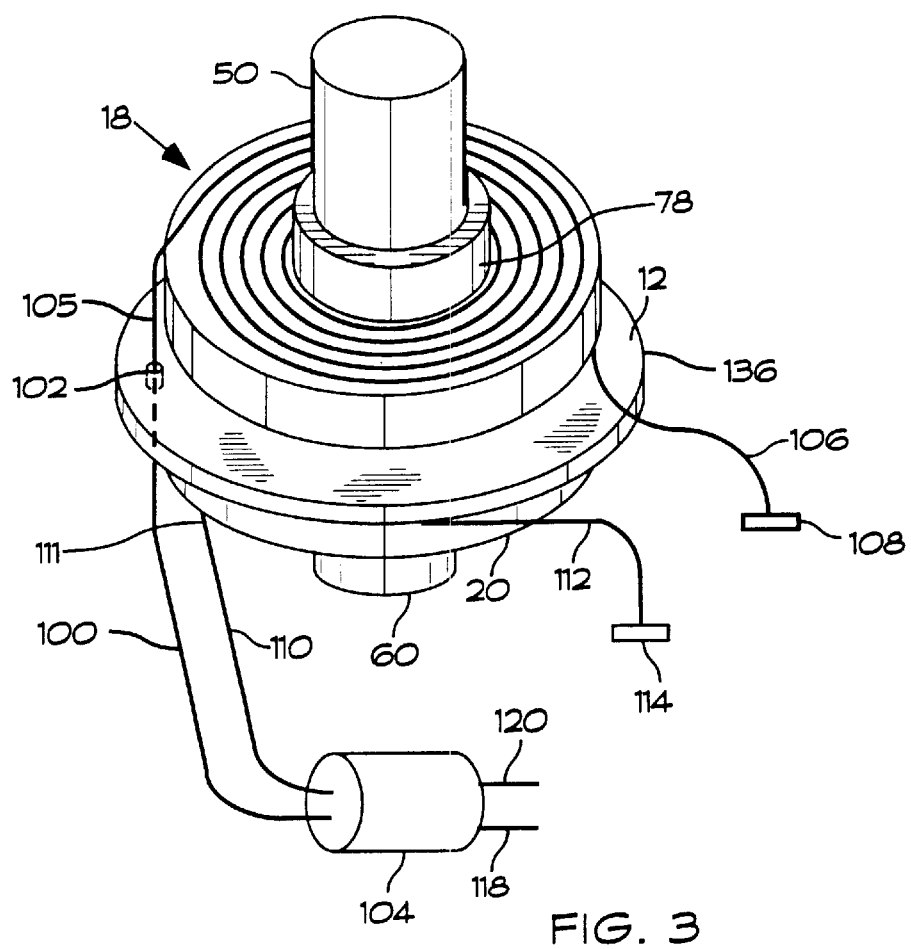
FIG. 3 shows a three-dimensional perspective view of the invention.

The first and second fiber optic coils 18 and 20 are included in an interferometer as explained below. As shown in FIGS. 1 and 3, a first fiber optic lead 100 from the optical coupler 104 is routed through a passage 102 in the flexural disk 12 and is connected via suitable splicing (not shown) to a lead 103 extending from an outer edge portion 105 of the first fiber optic coil 18. The optical coupler is preferably a 2×2 optical coupler that is well-known in the art. A second fiber optic lead 106 is routed from the first fiber optic coil 18 to a mirror 108. The second fiber optic lead 106 may extend from an inner end portion (not shown) of the first fiber optic coil 18. A third fiber optic lead 109 from the optical coupler 104 is connected via suitable splicing (not shown) to a lead 110 extending from an outer end portion 111 of the second fiber optic coil 20, and a fourth fiber optic lead 112 is routed from an inner portion (not shown) of the second fiber optic coil 20 to a mirror 114. The fourth fiber optic lead 112 may extend from an inner end portion (not shown) of the second fiber optic coil 120.

Although a simplified direct routing of fibers is shown in FIG. 1A for clarity, in standard practice there generally may exist several loops of excess fiber from the fiber optic leads 100 and 109 that need to be contained by a number of retainer tabs 116 from arbitrarily contacting the second fiber optic coil 20, thereby causing spurious optical noise that is indistinguishable from the desired signal. The retainer tabs 116, which generally number from eight to twelve, are spaced equidistantly apart and extend inwardly from an inner wall portion 117 of the second housing member 28. A plan view of the fiber routing is sown in FIG. 1B. A pair of optical fibers 118 and 120 extends from the optical coupler through a passage 122 in the sidewall 40 of the second housing member 28. Excess fiber from the fiber optic leads 118 and 120 may be coiled underneath retainer tabs 116 in a similar manner as described above. The passage 122 is normally sealed around the optical fibers 118 and 120 to prevent the passage of fluids into the housing 24.

Figure 4:
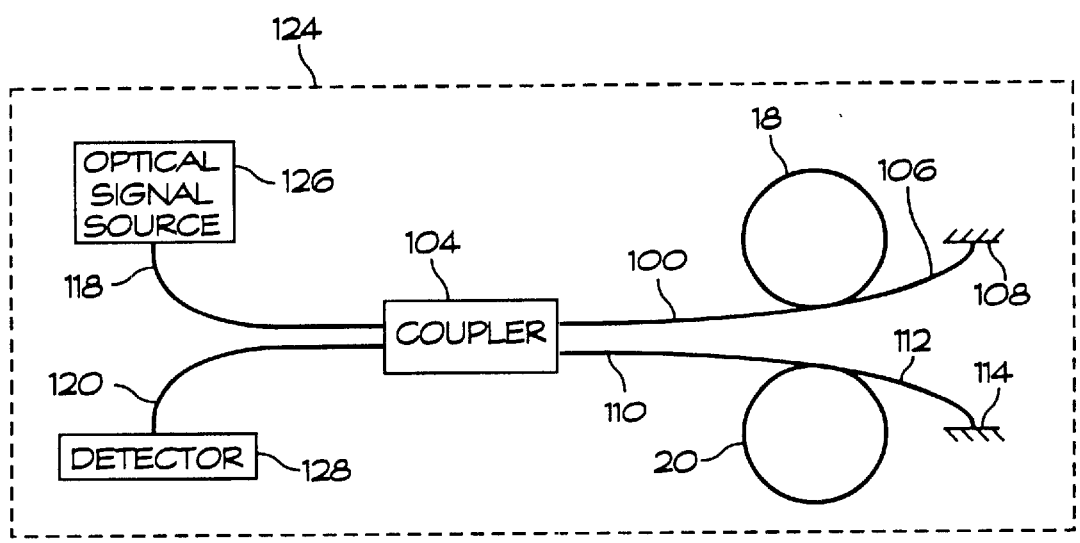
FIG. 4 is an optical schematic of an interferometric sensor that may be formed in accordance with the present invention.

FIG. 4 schematically illustrates how the first and second fiber optic coils 18 and 20, respectively, the optical coupler 104 and the mirrors 108 and 114 are used in forming an interferometer 124. FIG. 4 shows a well-known Michelson interferometer configuration, but the invention can be practiced using a Mach-Zehnder interferometer with the addition of a second optical coupler (not shown). It should be noted that a plurality of optical fiber splices ordinarily would be required to assemble the interferometer 124. Such splices are not shown because they are well known in the art.

A remotely located optical signal source 126 provides an optical signal to the optical fiber 118, which guides the optical signal to the fiber optic coupler 104. Signals output from the optical coupler 104 are input to the first and third fiber optic leads 100 and 110, respectively, to supply optical signals to the first and second fiber optic coils 18 and 20, respectively. Optical signals are output from the first and second fiber optic coils 18 and 20, respectively, to the fiber optic leads 108 and 112, respectively, which guide the optical signals to the mirrors 108 and 114, respectively. The optical signals reflect from the mirrors 108 and 114, travel through the first and second fiber optic coils 18 and 20, respectively, again and then propagate back to the optical coupler 104.

Motion of the housing 24 induced by an acoustic wave causes a flexing of the flexural disk assembly 22 in a direction perpendicular to its plane. This flexing causes equal and opposite (i.e. tensile and compressive) strains in each of the first and second fiber optic coils 18 and 20. These strains cause equal and opposite changes in the optical path lengths of the first and second fiber optic coils 18 and 20 and, hence, cause equal and opposite changes the phase of light traveling within them.

The optical signals combine in the optical coupler 104 to produce a phase modulated interference pattern caused by the phase changes in the optical signals as they pass through the first and second fiber optic coils 18 and 20, respectively. The optical coupler 104 couples the interferometer output into the optical fiber 120. A remotely located photodetector 128 receives the phase modulated interferometer output from the optical fiber 120 and produces an electrical signal that may be processed to determine the acceleration of the housing 24 that caused the optical path lengths to change.

Referring to FIG. 5, assembly of the interferometric sensor 10 of FIG. 1A includes the step of placing the damping member on either the post 50 or the post 60. In the following description it is assumed that the damping member is placed on the post 60. The shear damper 78 is expanded slightly when installed on the post 60 so that the end portion 62 of the post 60 extends to a location near the center of the shear damper 78. This leaves an unexpanded end portion 134 of the shear damper 78 extending away from the end face 66 of the post 60. The unexpanded end portion 134 of the shear damper 78 has an outside diameter smaller than the inside diameter of the central passage 74 of the flexural disk 12. This allows adequate clearance for easy installation of the flexural disk assembly 22 over the end portion 134 of the shear damper 78 and to seat into the groove 46 of the second housing member 28 as shown. The dowel pin 70 may then be inserted into the cylindrical recess 56 in the post 50 at this point or any time prior to this by a press-fit process that is well-known in the art.

The first housing member 26 may then be lowered to engage the second housing member 28 so that the tapered end portion 54 of the post 50 begins to enter the end portion 134 of the shear damper 78 and thus begins to elastically expand it. At the same time, continued insertion causes the dowel pin 70 to enter the cylindrical recess 64 in the post 60 until the end faces 58 and 66 of the posts 50 and 60, respectively, are in contact. An epoxy adhesive may be previously applied to the end faces 58 and 66 to provide an even more robust bond joint when cured. The first and second housing members 26 and 28, respectively, should be arranged so that an outer edge portion 136 of the flexural disk 12 is securely retained between the steps 35 and 42. Forcing the tapered end 54 of the post 50 into the damping member causes the shear damper 78 to expand radially outward to bring it into contact with the inner edge portion 76 of the flexural disk. An epoxy adhesive may be applied before final assembly to securely bond the outer portion of the flexural disk 12 between the steps 35 and 42 of the first and second housing members 26 and 28, respectively, and to make the housing 24 be impervious to fluids.

In the embodiment shown in FIG. 2, the shear damper 78 is slid over the tapered portion 96 of post 92 until a first end edge 140 of the shear damper 78 seats against a first edge 142 of the groove 98. The flexural disk assembly 22 is then mounted to the shear damper 78 as described above. An arbor press (not shown) may be used to complete the final assembly process by forcing the dowel pin 70 into the recess 64, which also seats a second end edge 144 of the shear damper 78 against a second edge 146 of the groove 98. It should be noted during this last step, the damping member becomes compressed axially between the steps 84 and 94 and is forced to expand radially to provide positive, intimate contact with the inner edge portion 74 of the flexural disk 12. The addition of radiuses 85 and 95 of the first and second posts 80 and 92, respectively, ensures that the radial expansion of the shear damper 78 does not cause entrapment of the damping member between the end faces 86 and 97 when fully seated.

This expansion of the shear damper 78 against the inner edge portion 74 of the flexural disk 12 helps the shear damper 78 to provide shear damping to the motion of the flexural disk and the attached first and second fiber optic coils 18 and 20, respectively. Additional benefits of the invention include a natural built-in degree of shock snubbing to prevent damage to the interferometric sensor 10 upon exposure to high levels of shock and vibration.

Figure 6:
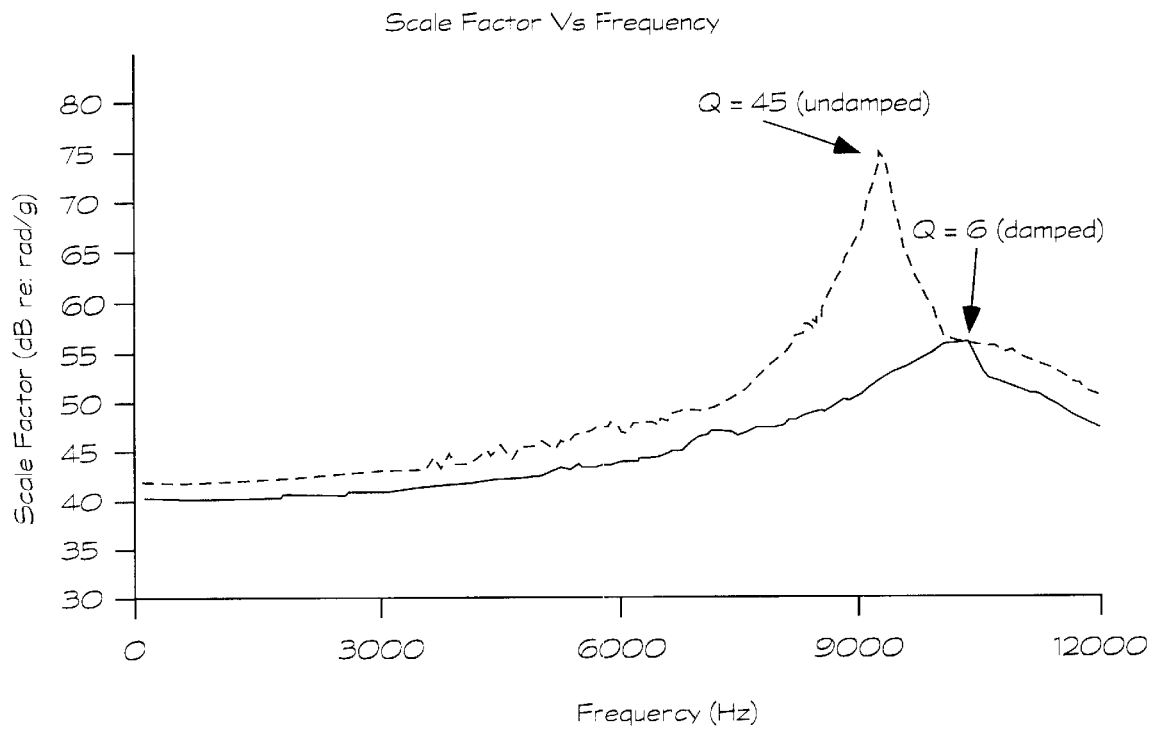
FIG. 6 graphically illustrates the flatter frequency response measurement of a shear-damped sensor according to the present invention compared to the frequency response measurement of an undamped sensor.

The interferometric sensor 10 according to the present invention may be used as an accelerometer. The interferometric sensor 10 uses commonly available elastomeric tubing with known viscoelastic damping properties in a shear damped configuration. In the interferometric sensor 10, the shear damper 78 is in contact with the inner edge portion 74 of the flexural disk 12. At resonance, the shear damper 78 acts to dampen extreme motions that high Q (about 45) resonances would otherwise cause in the flexural disk 12 and limit its maximum travel. FIG. 6 graphically illustrates the Q of a typical undamped accelerometer (not shown) and the Q of the interferometric sensor 10. The net effect of using the shear damper 78 is a significant increase in the system damping with a corresponding Q reduction down to 6 or less. Such a change in Q provides adequate dynamic range to perform within the acceptable operational band in systems that would otherwise have limited dynamic range.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A fiber optic sensor that includes a flexural disk having a pair of fiber optic coils mounted on opposite sides thereof and connected together to form an interferometer that produces a sensor output signal in response to acceleration of the flexural disk, comprising:

a housing having first and second end plates with a sidewall extending therebetween, the sidewall having an inwardly facing groove therein, the flexural disk having an outer edge portion mounted in the inward facing groove, the flexural disk having a central passage therethrough;

a support member extending between oppositely facing portions of the first and second end plates and extending through the central passage in the flexural disk with an inner edge of the central passage being spaced apart from the support member; and a damping member mounted on the central support member and arranged to exert a radial force on the inner edge of the flexural disk to dampen vibrations of the flexural member and thereby control the sensor output signal amplitude over a selected frequency range.

2. The fiber optic sensor of claim 1, wherein the support member is formed to have a pair of base portions connected to the first and second end plates, the damping member being mounted at a central region of the support member between the base portions, the damping member being restrained against lengthwise motion relative to the support member.

3. The fiber optic sensor of claim 2 wherein the support member is formed to have a circumference that increases lengthwise away from the central region, the damping member comprising a length of tubing formed of an elastomeric material, the damping member being mounted on the support member at the central region and restrained against movement away from the central region by elastic forces caused by the increasing circumference of the support member away from the central region.

4. The fiber optic sensor of claim 2 wherein the base portions are generally cylindrical and the central region is formed as a groove having a pair of edges defined by a pair of spaced-apart diameter steps in the support member and wherein the damping member has end portions that abut the end edges of the groove such that the damping member is retained within the groove.

5. The fiber optic sensor of claim 4 wherein the damping member is formed of an elastomeric material and wherein the damping member is axially compressed between the end edges of the groove such that the damping member is expanded radially and forced against the inner edge portion of the flexural disk such that the damping member is captured in the groove.

6. The fiber optic sensor of claim 5 wherein the groove has a diameter that decreases from the end edges of the groove toward a location equidistant therebetween.

7. A fiber optic sensor that includes a flexural disk having a pair of fiber optic coils mounted on opposite sides thereof and connected together to form part of an interferometer that produces a sensor output signal in response to acceleration of the flexural disk, comprising:
  a housing that includes a first housing member that includes a first end plate, a first sidewall extending from an outer edge of the first end plate and a first post extending from a central region of the first end plate and a second housing member that includes a second end plate, a second sidewall extending from an outer edge of the second end plate and a second post extending from the second end plate, the first and second sidewalls each having inward facing notches at end edge portions thereof, the first and second housing members being arranged end-to-end such that the inward facing notches define an inward-facing groove, the flexural disk having an outer edge portion mounted in the inward-facing groove and having a central passage therethrough;
  the first post having a first end face, the second post having a second end face, the first and second posts being aligned with the first and second end faces being adjacent to define a support member extending between oppositely facing portions of the first and second end plates and extending through the central passage in the flexural disk with an inner edge of the central passage being spaced apart from the support member; and
  a damping member mounted on a central region of the support member and arranged to exert a radial force on the inner edge of the flexural disk to dampen vibrations of the flexural disk and thereby control the sensor output signal amplitude over a selected frequency range.

8. The fiber optic sensor of claim 7, wherein the damping member is formed of an elastomeric material and arranged to be restrained against lengthwise motion relative to the support member.

9. The fiber optic sensor of claim 8 wherein the support member is formed to have a circumference that increases lengthwise away from the central region, the damping member comprising a length of elastomeric tubing, the damping member being restrained against movement away from the central region by elastic forces caused by the increasing circumference of the support member away from the central region.

10. The fiber optic sensor of claim 7 wherein the first post has a first generally cylindrical base portion and a first tapered end portion separated from the first base portion by a first diameter step and wherein the second post has a second generally cylindrical base portion and a second tapered end portion separated from the second base portion by a second diameter step, the first and second diameter steps defining end edges of a groove when the first and second posts are placed end-to-end, and wherein the damping member has end portions that abut the end edges of the groove such that the damping member is retained within the groove.

11. The fiber optic sensor of claim 10 wherein the damping member is formed of an elastomeric material and wherein the damping member is axially compressed between the end edges of the groove such that the damping member is expanded radially and forced against the inner edge portion of the flexural disk.

12. The fiber optic sensor of claim 11 wherein the groove has a diameter that decreases from a first diameter at a location adjacent the end edges of the groove to a second diameter at the end faces of the posts.

13. The fiber optic sensor of claim 10 wherein both first and second posts include end portions having a radius formed at their end faces to prevent pinching of the damping member between the end faces when the housing is assembled.

14. The fiber optic sensor of claim 7 wherein the first end face has a first recess therein and the second end face has a second recess therein and a dowel pin is arranged to extend into the first and second recesses to align the first and second posts and to add stiffening to the housing.

15. A method for forming a fiber optic sensor that includes a flexural disk having a pair of fiber optic coils mounted on opposite sides thereof and connected together to form an interferometer that produces a sensor output signal in response to movement of the flexural disk, comprising the steps of:
  forming a housing to have first and second end plates with a sidewall extending therebetween, the sidewall being formed to have an inwardly facing groove therein;
  mounting the flexural disk in the inwardly facing groove, the flexural disk having a central passage therethrough;
  forming a support member that extends between oppositely facing portions of the first and second end plates and that extends through the central passage in the flexural disk with an inner edge of the central passage being spaced apart from the support member;
  mounting a damping member on the central support member; and
  arranging the damping member to exert a radial force on the inner edge of the flexural disk to dampen vibrations of the flexural member and thereby control the sensor output signal amplitude over a selected frequency range.

16. The method of claim 15, including the steps of:

forming the support member to have a pair of base portions connected to the first and second end plates;

mounting the damping member at a central region of the support member between the base portions; and restraining the damping member against lengthwise motion relative to the support member.

17. The method of claim 15 including the steps of:

forming the support member to have a circumference that increases lengthwise away from the central region;

forming the damping member to comprise a length of tubing formed of an elastomeric material;

mounting the damping member on the support member at the central region; and restraining the damping member against movement away from the central region by elastic forces caused by the increasing circumference of the support member away from the central region.

18. The method of claim 16 including the steps of:

forming the base portions to be generally cylindrical;

forming the central region as a groove having a pair of end edges defined by a pair of spaced-apart diameter steps in the support member; and forming the damping member to have end portions that abut the end edges of the groove to retain the damping member within the groove.

19. The method of claim 18 including the steps of:

forming the damping member of an elastomeric material; and axially compressing the damping member between the end edges of the groove such that the damping member is expanded radially and forced against the inner edge portion of the flexural disk.

20. The method of claim 19 including the step of forming the groove to have a diameter that decreases from its end edges toward its center.

21. A method for forming a fiber optic sensor that includes a flexural disk having a pair of fiber optic coils mounted on opposite sides thereof and connected together to form part of an interferometer that produces a sensor output signal in response to acceleration of the flexural disk, comprising:

forming a housing that includes a first housing member that includes a first end plate, a first sidewall extending from an outer edge of the first end plate and a first post extending from a central region of the first end plate and a second housing member that includes a second end plate, a second sidewall extending from an outer edge of the second end plate and a second post extending from the second end plate;

forming the first and second sidewalls to each have inward facing notches at end edge portions thereof;

arranging the first and second housing members end-to-end such that the inward facing notches cooperate to define an inward-facing groove;

mounting a damping member at a central region of the support member;

mounting an outer edge portion of the flexural disk in the inward-facing groove;

aligning the first and second posts end-to-end to define a support member extending between oppositely facing portions of the first and second end plates;

arranging the support member to extend through a central passage in the flexural disk with an inner edge of the central passage being spaced apart from the support member; and arranging the damping member to exert a radial force on the inner edge of the flexural disk to dampen vibrations of the flexural disk and thereby control the sensor output signal amplitude over a selected frequency range.

22. The method of claim 21 including the steps of:

forming the damping member to comprise an viscoelastic material; and restraining the damping member against lengthwise motion relative to the support member.

23. The method of claim 22 including the steps of:

forming the support member to have a circumference that increases lengthwise away from the central region;

forming the damping member to comprise a length of elastomeric tubing; and restraining the damping member against movement away from the central region by elastic forces caused by the increasing circumference of the support member away from the central region.

24. The method of claim 21 including the steps of:

forming the first post to have a first generally cylindrical base portion and a first tapered end portion separated from the first base portion by a first diameter step;

forming the second post to have a second generally cylindrical base portion and a second tapered end portion separated from the second base portion by a second diameter step;

placing the first and second posts together end-to-end, such that the first and second diameter steps define end edges of a groove; and arranging end portions of the damping member to abut the end edges of the groove such that the damping member is retained within the groove.

25. The method of claim 24 including the steps of:

forming the damping member to comprise a viscoelastic material; and axially compressing the damping member between the end edges of the groove such that the damping member is expanded radially and forced against the inner edge portion of the flexural disk.

26. The method of claim 21 including the step of forming the groove to have a diameter that decreases from a first diameter at a location adjacent the end edges of the groove to a second diameter at end faces of the posts.

27. The method of claim 24 including the step of forming the end faces of both the first and second posts to have a radius such that a void is formed adjacent the end faces of the posts and the damping member to prevent the damping member from being pinched between the end portions of the first and second posts when they are placed end-to-end in the damping member.

* * * * *